United States Patent [19]

Wheeler et al.

[11] Patent Number: 4,694,140
[45] Date of Patent: Sep. 15, 1987

[54] AC POWER SUPPLY

[76] Inventors: William M. Wheeler, 5938 Eton Ct., San Diego, Calif. 92122; David C. Wheeler, 7860 Dancy Rd., San Diego, Calif. 92126; Ernest E. Wheeler, 5938 Dton Ct., San Diego, Calif. 92122

[21] Appl. No.: 798,123

[22] Filed: Nov. 14, 1985

[51] Int. Cl.⁴ ............................................. B23K 9/10
[52] U.S. Cl. .................................. 219/130.1; 336/60; 336/150; 336/229
[58] Field of Search ................. 219/130.1; 336/58, 94, 336/219, 173, 229, 60, 150

[56] References Cited

U.S. PATENT DOCUMENTS

| 1,320,980 | 11/1919 | Bowman | 336/229 |
| 2,179,661 | 11/1939 | Jones | 219/130.1 |
| 3,292,127 | 12/1966 | Dormaier | 336/229 |

FOREIGN PATENT DOCUMENTS 653628  3/1979  U.S.S.R. ............... 336/229

Primary Examiner—Clifford C. Shaw
Attorney, Agent, or Firm—Frank D. Gilliam

[57] ABSTRACT

The invention is directed to an AC power supply for portable welding machines or the like which employ a transformer of either single or multi-phase power wound around a cylindrical core. The core is constructed from a continuous length of steel alloy ribbon. The individual windings of both the primary and secondary are spaced apart. In operation the transformer is submerged in a heat transfer medium to provide cooling thereof by heat transfer therefrom. The transformer may have either a tapped primary or secondary or both to provide secondary amperage for the intended use of the transformer. An external cooling radiator may be employed to provide additional cooling to the heat transfer medium.

24 Claims, 9 Drawing Figures

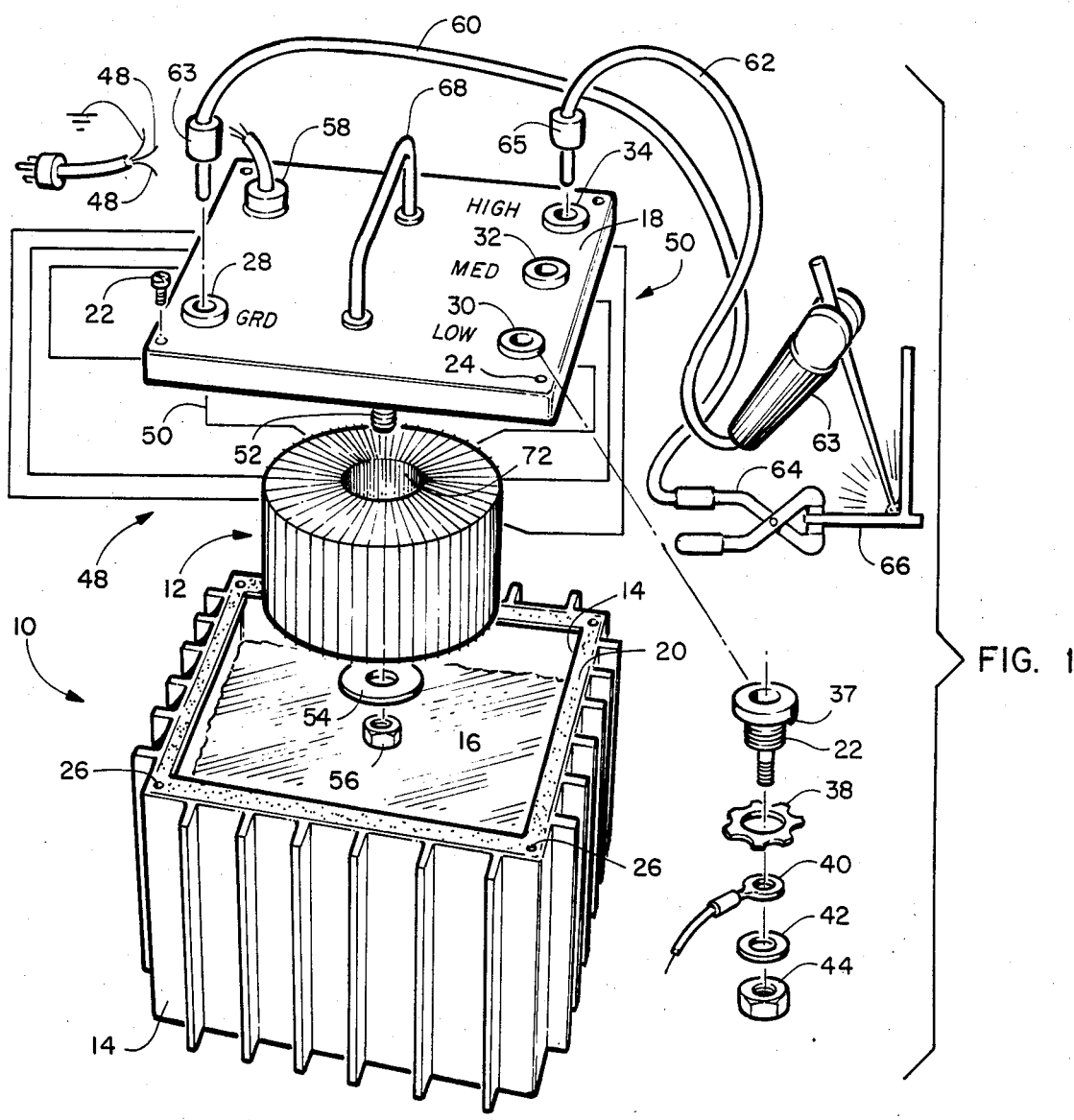
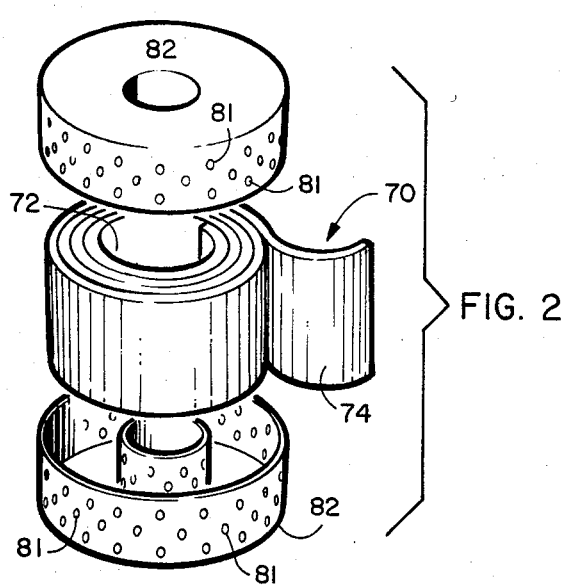
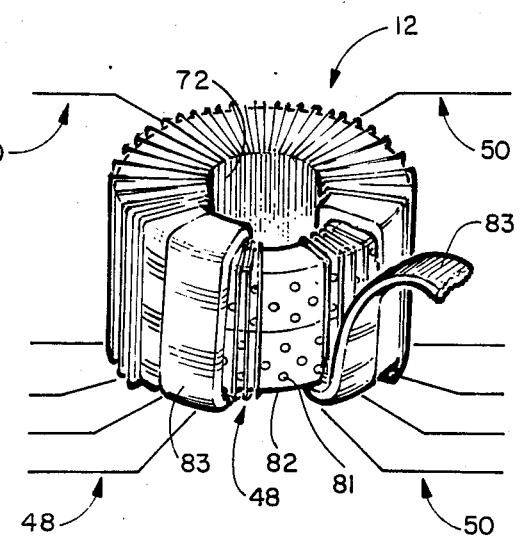

AC POWER SUPPLY

BACKGROUND OF THE INVENTION

This invention relates generally to AC welding machines or the like and more particularly to the design and colling methods directed to power transformers requiring high current low voltage outputs.

Transformers and other high current devices such as those used for AC welding and other power applications include transformers, resistors, solid state electronic devices and the like which transform, control and regulate output voltage at current levels required for various purposes.

These various electrical and electronic components become excessively hot during normal operation due to their internal electrical resistance. These internal losses especially in AC welding machines are at such high levels that these devices must be turned off during periods of operation due to overheating. If cooling is insufficient and excessive heating occurs, failure of the device will generally result which requires repair and/or replacement of the device.

Presently, the cooling of such devices of this type is fan provided air which is directed in a wide pattern toward the entire operating device. This type of cooling has been found to be insufficient to maintain proper cooling for operating equipment of this type at their normally recommended operating temperatures especially for any continuous length of time. It has been found that the power supply of an average portable AC welding machine is approximately 40% efficient and even the most efficient hardly ever exceed an efficiency of 50%. This means in effect that 50% to 60% of the power consumed by the device is due to its own internal electrical resistance. This internal resistance results in internal heat when connected to an AC source even while not having an output load.

Presently available portable AC welding machines, due to these internal losses, have a duty cycle ranging from approximately 20% to 50% that is 20% to 50% of their time can be used for their intended operation and the other 80% to 50% of their time is spent in an inactive or off state while the machine is cooling. For example, the average available AC welding machine uses a very high excitation current and in some cases the machine will consume excitation power of from 500 to 1500 watts when the machine is merely energized and has no output load.

With conservation of energy and maximum utilization of equipment in mind, applicants present invention amounts to a quantum advancement in the power transformer for the portable AC welding art.

SUMMARY OF THE INVENTION

The above noted problems and others are overcome by applicants' present invention which is directed to more efficient power transformers of the type employed in AC welding devices and to a more efficient means and method of cooling these and other types of electrical and electronic devices.

The transformer of the invention is constructed with a core formed by the winding of a continuous length of a steel alloy ribbon. The core has a central opening through which the windings are wrapped. The core is first encased in a perforated insulating material formed in two halves, one half of which slips over opposite ends of the core and extend within the central opening. The two halves completely cover the exposed core surfaces. The primary winding is then wrapped around the perforated insulation material extending through the central opening. The individual adjacent wire wrappings of the primary winding are substantially non-contacting to provide a space therebetween. A layer of loose woven tape webbing is then wound over the primary winding. The secondary winding is then wound over the layer of loose woven tape webbing with the adjacent wire wrappings spaced apart in the same manner as the primary winding to provide a gap therebetween. Transformers constructed according to this invention when used in portable welding machines have an efficiency of from 80% to 90% that is their internal lose is from 10% to 20%. This obviously results in a cooler operating transformer than those presently available in the portable welding art. The transformer is then submerged into a liquid such as transformer oil, melted wax or the like. Because of the space between the windings, the core perforations and the loose weave of the fiberglass webbing, the liquid comes in direct contact with the core and the windings. The cooling liquid will readily transfer the heat from the transformer windings and core to the wall of the container where it is dissipated into the air surrounding the exterior of the container. If additional heat dissipation is required due to output power requirements or operations in elevated ambient temperatures heat sinks or liquid cooling means, such as radiators may be included. The use of wax as the heat transfer medium allows the device to be easily transported due to the wax generally being solid through a range of ambient temperatures.

This cooling means will maintain the power transformer, at substantially its most efficient operating temperature.

An object of this invention is to provide an efficient portable welding machine power transformer with efficiency in the range of 80% to 90%.

Still another object of this invention is to provide various improved cooling means for power transformers and other electrical and electronic devices which elevate in temperature during operating.

Still another object of this invention is to provide a highly efficient improved power transformer and cooling means for an AC welding device.

Still another object of this invention is to provide a liquid cooling medium that is non-flowing at ambient temperatures.

Yet another object of this invention is to provide an improved AC welding device with a 100% duty cycle.

These and other objects and features will become apparent to those in the art while reading the specification in view of the following drawing figures wherein:

BRIEF DESCRIPTION OF THE DRAWINGS

FIG. 1 is an exploded perspective showing of the AC welding machine of the invention;

FIG. 2 is an exploded perspective showing of the core and end cap insulators;

FIG. 3 is a partial cut away showing of a single phase transformer of the invention exposing the core, windings and insulation;

DETAILED DESCRIPTION OF THE DRAWINGS

Figures 4, 4A:
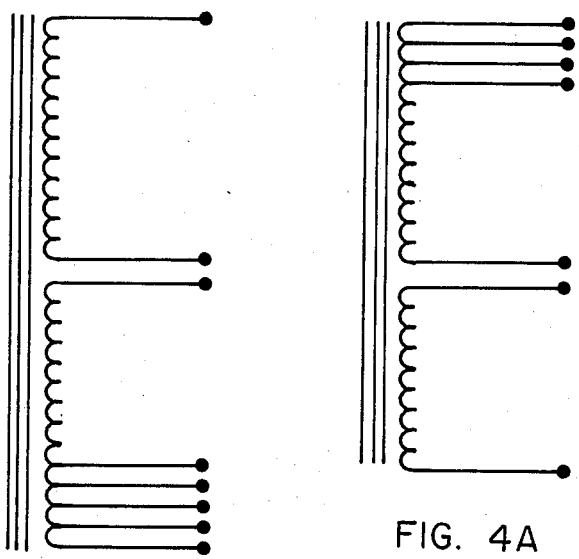
FIG. 4 is a schematic showing of a second embodiment of a single phase transformer with a tapped secondary.
FIG. 4A is a schematic showing of a third embodiment of a single phase transformer with a tapped primary.

Referring now to FIG. 1 which shows a perspective exploded view of a AC welding device 10 employing the power transformer 12 of the invention. The welding device 10 includes an open tank or reservoir 14 containing a cooling medium 16 such as, for example, transformer oil or melted wax. The tank may be constructed of metal or any convenient material suitable for the purpose intended. The transformer oil used may be DIALC produced by Shell Oil Company or an equivalent thereto and the wax may be any wax substance with a low melting temperature which is above a range of ambient temperatures. It should be understood, however, that any mediumn suitable for the purpose intended may be used. The reservoir 14 is enclosed by a lid 18 which is sealed to the reservoir 14 by a gasket 20. The gasket may be neoprene, rubber or the like. The lid 18 is secured to the reservoir by means of cap screws or bolts 22 and apertures 24 and threaded aperatures 26 in a conventionally known manner.

The lid 18 includes a plurality of jacks 28, 30, 32 and 34 which are, electrically insulated from the lid.

Jack 32 is typical of all the jacks used and comprises a female connector 36; a locking tab 37, to prevent jack rotation; a star locking washer 3B; a transformer lead connector 40; an insulation washer 42; and nut 44.

The power transformer 12 has a central opening 72 and is wound with spaced apart primary and secondary windings 48 and 50 respectfully. Specific details of the construction of the power transformer will be hereinafter discussed in more detail. The power transformer may be conveniently attached to the under surface of the lid 18 by means of stud bolt 52, insulating washer 54 and a lock nut 56. It should be further understood that the transformer may be attached to the tank or reservoir in any convenient manner suitable for the use intended or unattached mechanically. In multi-phase applications, the transformers should be separated by an insulation means.

The ends of the primary winding 48 of the power transformer 12 are connected to a flexible power cord which passes through a sealed grommet 58 for connection to a convenience wall outlet (not shown).

A pair of welding cables 60 and 62 with male plug ends 63 and 65 respectively are each received in a selected one of the female jacks 28-34. Cable 60 has a clamp means 64 on one end for grounding the electrical low end of the secondary winding 50 to the work piece 66. The cable 62 has a welding stick or electrode holder on one end for striking an arc in a weld location on work piece 66 in a conventional and well known manner.

A handle 68 is fixedly attached to the upper surface of the lid 18 for case of handling the devise. The welding device 10 when fully assembled including cooling medium is very light in weight and highly portable.

Referring now to FIG. 2, a partially wound power transformer core 70 is shown. The core 70 is cylindrical with a central opening 72. The core is formed by winding a continuous length of metallic ribbon 74 tightly in the configuration as shown. Typically, the ribbon is formed from a high grade silicon steel alloy of approximately 29 gauge (0.014 inches thick). Obviously other types of magnetic metal and various other thickness can be employed to practice the invention. The core can have variations of dimensions such as, for example, and not by way of limitation, central openings 72 that may vary in diameter between 1.5 and 2.5 inches. The diameter of the core including the central opening can vary between 3 and 5 inches and the height of the core can vary between 2.5 and 6 inches. Ideally, the core will have a central opening 72 of 2 inches, a diameter of 3.5 inches and a height of 5 inches. These dimensions provide a reduction in the magnetic path and an increase the core cross-sectional area which increases the efficiency of the transformer employing the core.

After being tightly wound, the core 70, as shown in FIG. 2, is enclosed by two end cap insulators halves 82 with a plurality of perforation 81 therethrough formed to completely enclose the exposed surfaces of the core. These insulator caps are formed of plastic or the like. The two insulator caps abut each other as shown on the transformer of FIGS. 1 and 3.

Referring now to FIG. 3, a perspective view of the insulated core of FIG. 1 is shown. First wrapped around the insulated core are the primary windings 4B. The wires or strands B4 of the primary windings are wrapped around the insulator enclosed core through the central opening 72 in a non-contacting relationship that is, the adjacent wires or strands do not touch one another. A layer of insulating material 83 is then wound over the primary windings in a manner that completely encloses the primary winding. The insulating material 83 preferably in the form of an open weave porous material having a width which allows ease of wrapping around the primary windings through the opening 72. a width of insulating material 83 in the form of a tape in the range of one half inch to one and one-quarter inches has been found to be satisfactory; however, any width suitable for the purpose intended may be choosen. The insulating material 83 must be constructed of a loosely woven material suitable for the purpose intended that is capable of preventing any arc over between the primary and secondary windings while allowing the cooling medium in the tank to wick or pass through to the windings of the primary winding. One inch wide woven nylon, belting material commercially used as straps for hand carts and the like has proven to be a very good insulator 83. It should be understood, however, that other material such as, for example, Rayon, Polyester, Kevlar and the like as well as other materials synthetic or natural fiber suitable for the purpose intended could also be used as the insulator 83. The secondary winding 50 is then wound over the insulator 83 in the same manner as the primary winding was wound on the insulator covered core. A transformer constructed in this manner and utilized in a portable welder has an efficiency of from 80% to 90%.

In operation, the cooling medium in the tank transfers heat from the core 70 through the insulator perforations 81, from the primary winding by contact with substantially the entire surface of each winding of the primary winding, through the pores of the insulator 83 and from the secondary winding by contact with substantially the entire surface of the windings of the secondary windings. The elevated temperature of the liquid is dissipated through the walls of the tank to the atmosphere. When wax is used for the cooling medium the wax is heated to a melt and then poured into the tank in sufficient quantity to engulf the transformer. The wax then sets up in a solid form. When the transformer is latter energized, the heat therefrom remelts the wax to a liquid. The liquid wax works in the same manner as any other suitable liquid for cooling purposes and dissipates heat from the core and windings to the liquid and hence to the walls of the tank.

Figure 5:
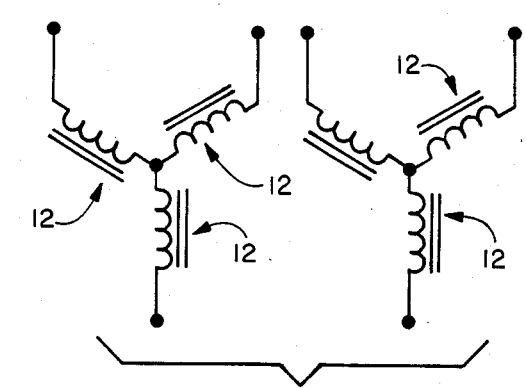
FIG. 5 is a schematic showing of a three phase "Y" wound power transformer.

The transformer 12 of FIGS. 5, 4 and 4A show a tapped secondary and primary winding respectively. For example, the primary winding of the FIG. 4 transformer is approximately 168 turns of ASW #17 copper wire and the secondary is approximately 122 turns of ASW #12 copper wire. The taps of both windings are located at selected locations between the outer end connections for required transformers inputs and outputs. The winding of the FIG. 4 and 4A transformers provide for a high voltage, low current input and a low voltage, high current output.

FIG. 5 depicts a schematic showing of a multi-phase transformer employing three transformers 46. It should be understood that two or more transformers 46 can be employed for multi-phase operation. The transformer 46 used for multi-phase operation, like, the single phase operation, can be tapped for various power requirements.

Figure 6:
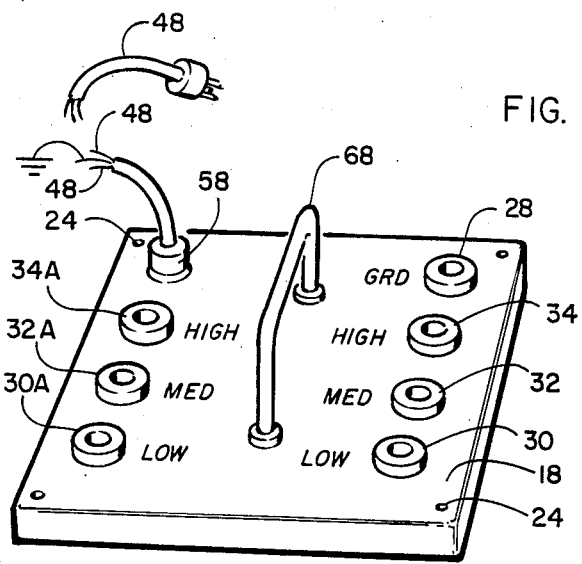
FIG. 6 is a schematic showing of a power transformer with a rotatable means for selecting secondary tape for various different output currents.

Referring now to FIG. 6, a schematic exploded showing of a single phase power transformer with a tapped secondary and a rotatable tap selector 86. The tap selected 86 comprises an insulation ring 88 with the angular copper contacts 90 space therearound and connected to the various winding taps. The transformer secondary winding end 28 is connected to the work piece as shown in FIG. 1. An insulated bar assembly 92 with a brush 94 is rotatably attached in contact with the insulation ring 88 by means of adjustment knob/screw combination 96 which is secured by slip washer 98 and lock nut 100. A coil spring for bias is positioned between the underside of the knob of adjustment knob/screw combination 96 and the upper surface of the insulated bar assembly 92. The adjustment knob/screw is key to the insulate bar assembly so that when the knob is turned the insulated bar assembly. With the insulated bar assembly in position on the insulated ring, the brush will contact different taps as rotated. The brush 94 is electrically connected to cable 62. A variable thermistor 101 adjusted for a temperature in the range of 120° F. to 180° F. is in series with the secondary winding and terminal 28 (low side) to insure a non-overheating condition due to unforseen circumstances.

Figure 7:
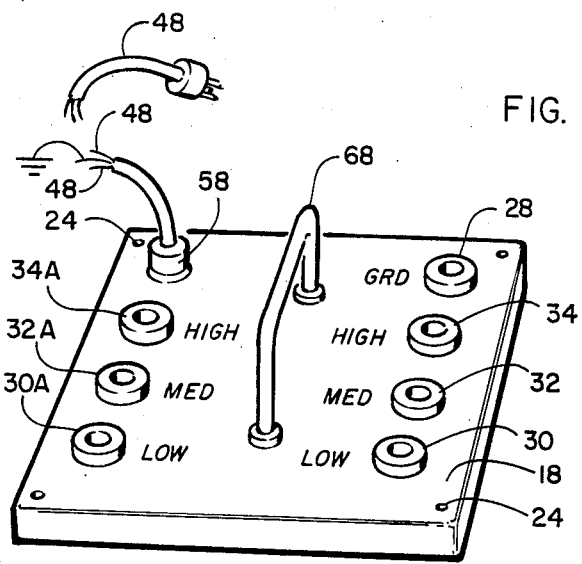
FIG. 7 is a perspective showing of a second embodiment of a lid for the fluid reservoir having primary tapped jack connections and secondary jack connections.

FIG. 7 is a perspective showing of a second embodiment of the lid 18 which includes primary tap jacks 28A, 30A, 32A and 34A which are identical to those jacks of FIG. 1.

Figure 8:
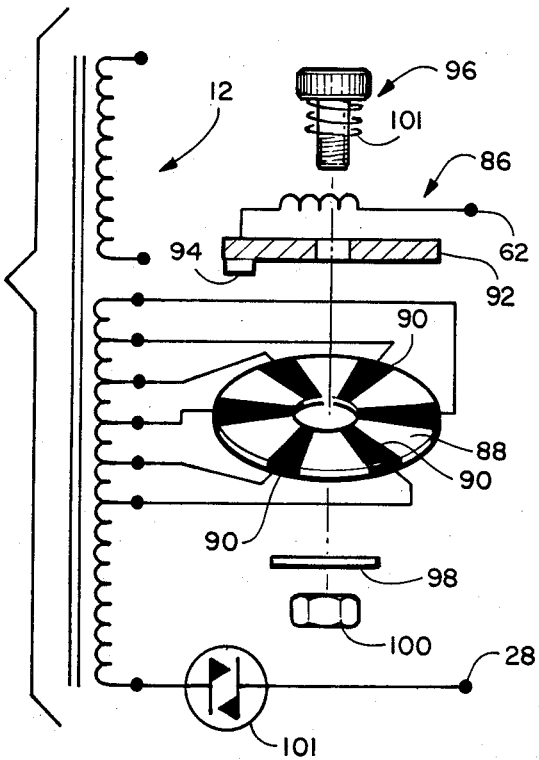
FIG. 8 is a perspective showing of the fluid reservoir with an external fluid cooling pump and radiator.

FIG. 8 is a perspective schematic showing of the tank or reservoir 14 of FIG. 1 and further includes an external cooling means 102 used with a liquid cooling medium. The external cooling means comprises conducts 104 and 106 leaving and entering the tank or reservoir respectfully. Hot liquid is pumped by pump 108 driven by a convenient motor 110 from the tank through conduit 104 to radiator 112 and returned, now cooled, through conduit 106 into tank or reservoir 14. A fan 114 also driven by motor 110 pulls air across the radiator fins 111 for aiding in cooling the heated fluid being pumped through the radiator.

With either the welding device of FIGS. 1 or 8, 100% duty cycle can be achieved.

It will be apparent to those skilled in this art that many modifications and variations may be effected without departing from the spirit and scope of the novel concepts of the present invention.

What is claimed is:

1. An improved portable AC welding machine comprising:
    a liquid tight tank with a removable lid thereon;
    a power transformer positioned within said tank, said power transformer comprising, a cylinderical core with an open tubular center, perforated insulation material enclosing said core, a primary electrically winding wound over said perforated insulation material, a wrapping of porous insulation material over said primary winding and a secondary winding wound over said porous insulation material, the ends of said primary and secondary windings extend external of said tank;
    an insulating medium within said tank engulfing said power transformer, said insulating medium is liquid at least when said power transformer is at operating temperature;
    a pair of welding cables extending from said ends of said secondary windings; and
    a power source for connecting to said ends of said primary winding.

2. The invention as defined in claim 1 wherein said core is constructed from tightly wound from a continuous length of magnetic metal foil.

3. The invention as defined in claim 2 wherein said magnetic metal foil is a silicon steel alloy.

4. The invention as defined in claim 3 wherein said magnetic metal foil is approximately 0.014 inches thick.

5. The invention as defined in claim 1 wherein a liquid tight seal is positioned between the upper surface of said container and said lid.

6. The invention as defined in claim 1 wherein said core has a length of from 2.5 inches to 5 inches and has a diameter of from 3 inches to 4 inches.

7. The invention as defined in claim 1 wherein said core has a length of approximately 5 inches and a diameter of approximately 3.5 inches.

8. The invention as defined in claim 1 wherein the insulation material enclosing the core is in the form of two half sleeves which fit over the ends of the core and extend into the tubular center.

9. The invention as defined in claim 1 wherein said porous material is in the form of a loosely woven tape.

10. The invention as defined in claim 1 wherein said primary winding has at least one electrical tap connection located intermediate its ends and a removable connector means for connecting selected primary winding connections to a source of AC power.

11. The invention as defined in claim 10 wherein one end and said at least one tap connection are selectively connected to one of said welding cables through a rotatable connector means.

12. The inventions as defined in claim 1 wherein said secondary winding has at least one tap connection located intermediate its ends which extends to connector means that pass through said cover and are insulated therefrom, said welding cables extend from two selected connector means to the work piece to be welded.

13. The invention as defined in claim 1 wherein said insulating medium is transformer oil.

14. The invention as defined in claim 1 wherein said insulating medium is wax.

15. The invention as defined in claim 1 wherein said secondary winding includes a plurality of electrical taps located between the ends of the winding and said connector means comprises a switching means for selectively connecting one end of said secondary winding or one of said plurality of electrical taps to one of said welding cables.

16. The invention as defined in claim 1 wherein a space is provided between the individual windings of said primary winding.

17. The invention as defined in claim 1 wherein the individual windings of said secondary winding are non-contacting.

18. The invention as defined in claim 1 wherein a space is provided between the individual windings of said secondary winding.

19. The invention as defined in claim 1 wherein the individual windings of said primary and secondary winding are substantially non-contacting.

20. The invention as defined in claim 1 wherein the individual windings of said primary and secondary windings are spaced apart.

21. The invention as defined in claim 1 further including external cooling means for insulating said cooling medium.

22. The invention as defined in claim 21 wherein said external cooling means comprises a first conduit communicating with the liquid in said container, a radiator element having a fluid input and output, with said input connected to said first conduit, a second conduit connected to said output of said radiator and communicating with said container, a pump means for circulating said liquid from said container through said radiator and back to said container and a fan for forcing air across said radioator element.

23. The invention as defined in claim 21 wherein said external cooling means, comprise fins positioned externally of said container.

24. The invention as defined in claim 1 wherein said windings are multi-phase.

* * * * *